United States Patent
Manaka et al.

(10) Patent No.: US 8,335,135 B2
(45) Date of Patent: Dec. 18, 2012

(54) STEPPING MOTOR CONTROL CIRCUIT AND ANALOGUE ELECTRONIC TIMEPIECE

(75) Inventors: Saburo Manaka, Chiba (JP); Akira Takakura, Chiba (JP); Kenji Ogasawara, Chiba (JP); Kazumi Sakumoto, Chiba (JP); Kazuo Kato, Chiba (JP); Keishi Honmura, Chiba (JP); Takanori Hasegawa, Chiba (JP); Kosuke Yamamoto, Chiba (JP); Hiroshi Shimizu, Chiba (JP)

(73) Assignee: Seiko Instruments Inc. (JP)

( * ) Notice: Subject to any disclaimer, the term of this patent is extended or adjusted under 35 U.S.C. 154(b) by 529 days.

(21) Appl. No.: 12/653,533

(22) Filed: Dec. 15, 2009

(65) Prior Publication Data

US 2011/0026375 A1 Feb. 3, 2011

(30) Foreign Application Priority Data

Dec. 25, 2008 (JP) ............... 2008-330482
Oct. 23, 2009 (JP) ............... 2009-244871

(51) Int. Cl.
 *H02P 8/38* (2006.01)
 *G04B 19/04* (2006.01)
(52) U.S. Cl. .......................... 368/80; 318/696
(58) Field of Classification Search .......... 368/80; 318/696
See application file for complete search history.

(56) References Cited

U.S. PATENT DOCUMENTS

| 4,272,837 | A | * | 6/1981 | Ueda et al. | 368/80 |
| 5,550,795 | A | * | 8/1996 | Takakura et al. | 368/157 |
| 5,889,734 | A | * | 3/1999 | Sato | 368/64 |
| 6,262,554 | B1 | * | 7/2001 | Kojima et al. | 318/685 |
| 6,396,772 | B1 | * | 5/2002 | Yabe et al. | 368/204 |
| 6,946,814 | B2 | * | 9/2005 | Takemori et al. | 318/685 |
| 7,283,428 | B2 | * | 10/2007 | Ogasawara | 368/157 |
| 7,606,116 | B2 | * | 10/2009 | Manaka et al. | 368/157 |
| 7,885,361 | B2 | * | 2/2011 | Iorga | 375/326 |
| 8,111,033 | B2 | * | 2/2012 | Ogasawara et al. | 318/696 |
| 8,219,003 | B2 | * | 7/2012 | Kudo et al. | 399/167 |
| 2008/0089183 | A1 | | 4/2008 | Manaka et al. | 368/202 |

OTHER PUBLICATIONS

Patent Abstracts of Japan, publication No. JP54077164, publication date Jun. 20, 1979.

* cited by examiner

*Primary Examiner* — Sean Kayes
(74) *Attorney, Agent, or Firm* — Adams & Wilks

(57) ABSTRACT

When a stepping motor is driven to rotate by a main driving pulse, if an induced signal exceeding a reference threshold voltage is detected only in a third segment, a pulse down operation is performed, and the main driving pulse is not changed when the same is detected in at least a first and the third segments. When it is detected only in a second and the third segments, a rank-up is performed without performing the driving by a correction drive pulse and, when it is not detected in at least the third segment, the rank up operation is performed after the driving by the correction driving pulse.

20 Claims, 9 Drawing Sheets

| DETECTION OF ROTATION | | | | RANK OPERATION | | |
|---|---|---|---|---|---|---|
| T1a | T1b | T2 | DETERMINATION | JUDGMENT | P1 | P2 |
| 0 | 0 | 1 | NORMAL LOAD | DOWN | −1 RANK | NO OPERATION |
| 1 | 0 | 1 | SMALL LOAD | MAINTAINED | ±0 RANK | NO OPERATION |
| 1 | 1 | 1 | SMALL LOAD | MAINTAINED | ±0 RANK | NO OPERATION |
| 0 | 1 | 1 | LARGE LOAD | UP | +1 RANK | NO OPERATION |
| 0 | 0 | 0 | NO-ROTATION | P2+UP | +1 RANK | OPERATED |
| 0 | 1 | 0 | NO-ROTATION | P2+UP | +1 RANK | OPERATED |
| 1 | 0 | 0 | NO-ROTATION | P2+UP | +1 RANK | OPERATED |
| 1 | 1 | 0 | NO-ROTATION | P2+UP | +1 RANK | OPERATED |

FIG. 3

| STATE | ROTATIONAL BEHAVIOR | VRs OUTPUT TIMING | PULSE OPERATION |
|---|---|---|---|
| NORMAL LOAD | | | PULSE DOWN |
| SMALL LOAD | | | MAINTAINED |
| LARGE LOAD | | | PULSE UP |
| NO-ROTATION | | | PULSE UP + P2 |

FIG. 4

| DETECTION OF ROTATION | | | | RANK OPERATION | | |
|---|---|---|---|---|---|---|
| T1a | T1b | T2 | DETERMINATION | JUDGMENT | P1 | P2 |
| 0 | 0 | 1 | NORMAL LOAD | DOWN | −1 RANK | NO OPERATION |
| 1 | 0 | 1 | SMALL LOAD | MAINTAINED | ±0 RANK | NO OPERATION |
| 1 | 1 | 1 | SMALL LOAD | MAINTAINED | ±0 RANK | NO OPERATION |
| 0 | 1 | 1 | LARGE LOAD | UP | +1 RANK | NO OPERATION |
| 0 | 0 | 0 | NO-ROTATION | P2+UP | +1 RANK | OPERATED |
| 0 | 1 | 0 | NO-ROTATION | P2+UP | +1 RANK | OPERATED |
| 1 | 0 | 0 | NO-ROTATION | P2+UP | +1 RANK | OPERATED |
| 1 | 1 | 0 | NO-ROTATION | P2+UP | +1 RANK | OPERATED |

STEPPING MOTOR CONTROL CIRCUIT AND ANALOGUE ELECTRONIC TIMEPIECE

BACKGROUND OF THE INVENTION

1. Technical Field

The present invention relates to a stepping motor control circuit and an analogue electronic timepiece using the stepping motor control circuit.

2. Description of the Related Art

In the related art, in an analogue electronic timepiece or the like, a stepping motor including a stator having a rotor storage hole and a positioning portion for determining a stop position of a rotor, the rotor disposed in the rotor storage hole, and a coil, in which the rotor is rotated and the rotor is stopped at a position corresponding to the positioning portion by causing the stator to generate a magnetic flux by supplying alternating signals to the coil is used.

A method employed as a method of controlling the stepping motor is a correction driving system in which whether the stepping motor is rotated or not is detected by detecting an induced signal corresponding to an induced voltage generated in the stepping motor when the stepping motor is driven by a main driving pulse, and the stepping motor is driven by a main driving pulse having a different pulse width or is forcedly rotated by a correction driving pulse having the pulse width larger than that of the main driving pulse according to the result of detection of whether or not the stepping motor is rotated (for example, see JP-B-61-15385).

In WO2005/119377, when detecting the rotation of the stepping motor, a unit for comparing and determining a detected time and a reference time in addition to the detection of the induced signal is provided and, after having rotated the stepping motor with a main driving pulse P11, if the induced signal is lower than a predetermined reference threshold voltage Vcomp, a correction driving pulse P2 is outputted and the main driving pulse P1 for the next time is changed to a main driving pulse P12 having a larger energy the main driving pulse P11 for driving. When the detection time when rotating the rotor with the main driving pulse P12 is earlier than the reference time, the main driving pulse P12 is changed to the main driving pulse P11, and the rotation is made with a main driving pulse P11 according to a load during the drive, so that the current consumption is reduced.

However, there is a problem such that a time of the day when a peak of the induced signal occurs due to free vibrations of the rotor is affected by gear train load fluctuations, and variations in peak voltage increase in proportion to the elapse of time.

Since variations in load exist in individual movements, there arises a problem such that it is difficult to perform a stable driving pulse control on the basis of a peak occurrence time of the induced signal.

SUMMARY OF THE INVENTION

It is an aspect of the invention to perform a stable driving pulse control by performing an accurate detection of rotation without being affected by fluctuations or variations in load.

According to the aspect of the invention, there is provided a stepping motor control circuit including: a rotation detecting unit configured to detect an induced signal generated by a rotation of a rotor of a stepping motor and detect the state of rotation of the stepping motor depending on whether or not the induced signal exceeds a predetermined reference threshold voltage in a predetermined detecting segment; and a control unit configured to control the rotation of the stepping motor by any one of a plurality of main driving pulses having energies different from each other or a correction driving pulse having larger energy than the respective main driving pulse according to a result of detection by the rotation detecting unit, in which the detection segment is divided into a first segment immediately after the drive with the main driving pulse, a second segment after the first segment, and a third segment after the second segment, the first segment is a segment for determining the state of rotation of the rotor in a second quadrant, and the second segment and the third segment are segments for determining the state of rotation of the rotor in a third quadrant in a state in which the increment of the load is smaller (small load) than a normal load, and the control unit changes the main driving pulse to a main driving pulse having larger energy when the rotation detecting unit does not detect the induced signal exceeding the reference threshold voltage in at least one of the first segment and the third segment, but detects in the second segment.

When the rotation detecting unit detects the induced signal exceeding the reference threshold voltage in the second segment, the control unit changes the main driving pulse to a main driving pulse having larger energy.

Preferably, the control unit changes the main driving pulse to a main driving pulse having larger energy without driving with the correction driving pulse when the rotation detecting unit detects the induced signal exceeding the reference threshold voltage in the second segment, and if the induced signal exceeding the reference threshold voltage is detected in the third segment.

Preferably, the control unit drives with the correction driving pulse and then changes the main driving pulse to a main driving pulse having larger energy when the rotation detecting unit does not detect the induced signal exceeding the reference threshold voltage in the third segment.

Preferably, the control unit does not change the main driving pulse when the rotation detecting unit detects the induced signal exceeding the reference threshold voltage at least in the first segment and the third segment.

Preferably, the control unit changes the main driving pulse to a main driving pulse having smaller energy when the rotation detecting unit detects the induced signal exceeding the reference threshold voltage once or continuously by a predetermined number of times only in the third segment.

Preferably, the control unit drives by the correction driving pulse and then changes the main driving pulse to a main driving pulse having smaller energy by a predetermined amount when the driven main driving pulse has maximum energy.

Preferably, the control unit drives by the correction driving pulse and then changes the main driving pulse to a main driving pulse having minimum energy.

Preferably, the control unit drives by the correction driving pulse and then does not change the main driving pulse when the driven main driving pulse has maximum energy.

Preferably, a period from a driving starting time point by the main driving pulse until a rotating state detection starting time point of the rotation detecting unit is set to a certain period even when the energy of the driven main driving pulse is different, and the control unit changes the energy of the main driving pulse by changing a pulse width.

According to another aspect of the invention, there is provided an analogue electronic timepiece having a stepping motor configured to drive a time-of-day hand to rotate, and a stepping motor control circuit configured to control the stepping motor, in which the stepping motor control circuit as described above is used as the stepping motor control circuit.

According to the stepping motor control circuit in the invention, by performing a driving pulse control on the basis of the induced signal generated in the initial rotation detecting segment having a small load fluctuation immediately after the blockage of the main driving pulse, the stability of the driving pulse control can be realized by performing the accurate detection of rotation without being affected by the fluctuation or variations in the load, so that the occurrence of excessive pulse up control is retrained, and reduction of the current consumption is achieved.

Also, by the reduction of the variations of pulse down control, control to prevent the pulse down to the main driving pulse having a potential to cause the state of no-operation is enabled, so that stabilization of the rotating operation is enabled and, improvement of design flexibility is advantageously achieved.

According to the analogue electronic timepiece in the invention, occurrence of excessive pulse up control is restrained and reduction of current consumption is achieved.

Prevention of the rank down to the main driving pulse having a potential to cause the state of no-rotation is enabled, so that the accurate time counting operation is advantageously enabled.

BRIEF DESCRIPTION OF THE DRAWINGS

FIG. 3 is a timing chart for explaining an operation of a stepping motor control circuit and the analogue electronic timepiece according to the embodiment of the invention;

FIG. 4 is a determination chart for explaining the operation of the stepping motor control circuit and the analogue electronic timepiece according to the embodiment of the invention;

DESCRIPTION OF THE PREFERRED EMBODIMENTS

Figure 1:
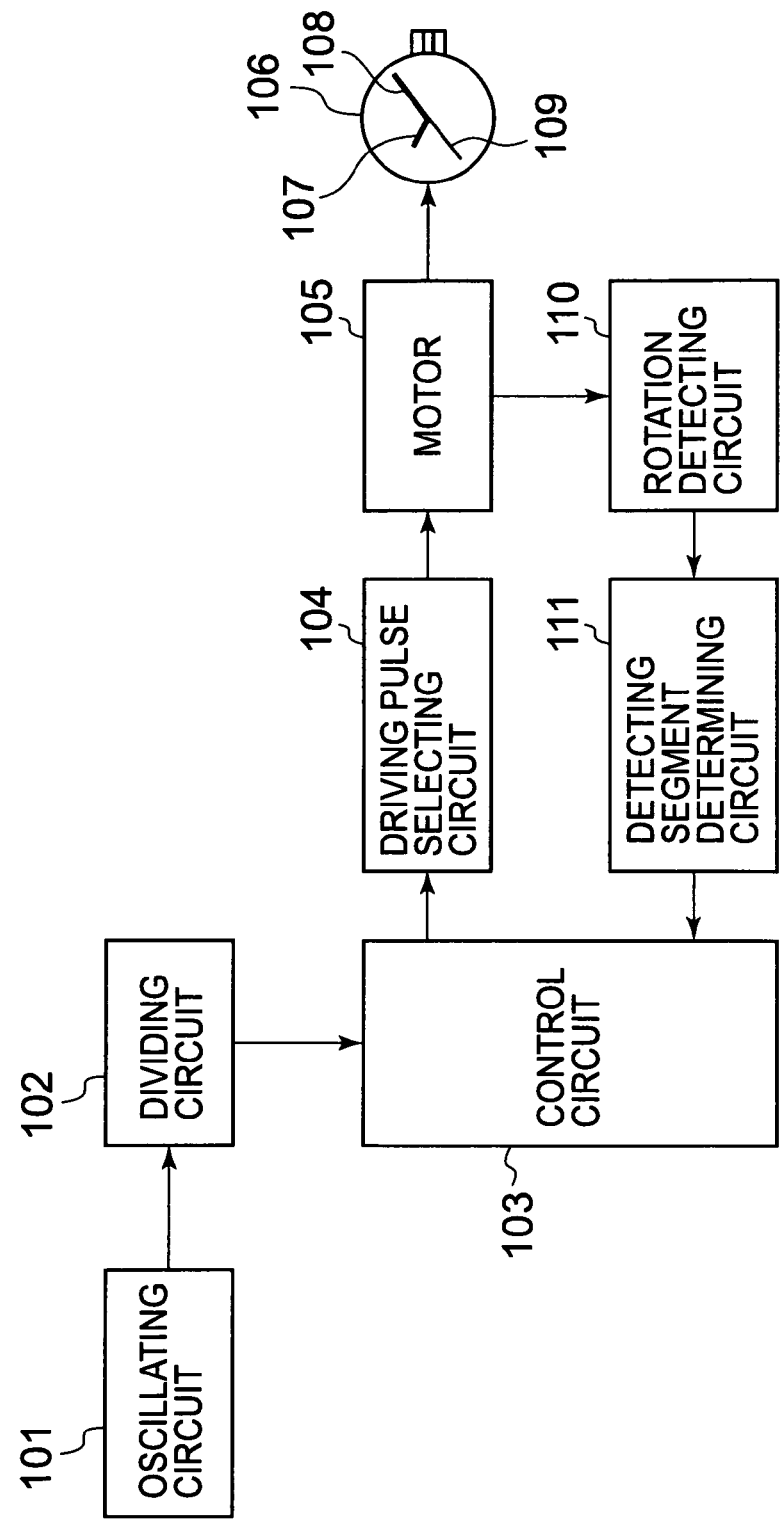
FIG. 1 is a block diagram of an analogue electronic timepiece according to an embodiment of the invention.

FIG. 1 is a block diagram of an analogue electronic timepiece using a motor control circuit according to an embodiment of the invention showing an example of an analogue electronic wrist timepiece.

The embodiment of the invention will be described in brief. An induced signal generated by the rotation of a stepping motor is generated by a vibration of a rotor after a driving pulse is blocked. The timing when the induced signals are generated in rotation detecting segments T1a and T1b of initial vibration immediately after a driving pulse blockage is characterized by being limited to a range from a state of being driven to rotate without any reserved capacity (almost stopped) to a state having a reserved capacity for driving to some extent, and not being generated when a sufficient reserved rotational capacity is present.

In consideration of such characteristics, the stability of control is realized by performing a pulse control on the basis of the induced signals generated in the rotation detecting segments T1a and T1b having small load fluctuations (for example, gear train load fluctuations) immediately after the driving pulse blockage.

For example, when an induced signal exceeding a predetermined reference threshold voltage is generated in the rotation detecting segment T1a, it is determined that the reserved capacity of rotation is reduced, and a main driving pulse is maintained without changing, so that the main driving pulse is not changed to a main driving pulse having small energy. When the induced signal exceeding the predetermined reference threshold voltage is generated in the rotation detecting segment T1b, it is determined that the reserved capacity of rotation is further reduced and hence is almost stopped, so that the main driving pulse is changed to a main driving pulse having large energy without outputting a correction driving pulse P2.

The invention will be described in detail on the basis of embodiments.

In FIG. 1, the analogue electronic timepiece includes a oscillating circuit 101 configured to generate a signal of a predetermined frequency, a dividing circuit 102 configured to divide the signals generated in the oscillating circuit 101 to generate a time signal as a reference of a time count, a control circuit 103 configured to control respective electronic circuit elements which constitute an electronic timepiece or to control the change of the driving pulses, a driving pulse selecting circuit 104 configured to select and output the driving pulse for driving the motor to rotate on the basis of a control signal from the control circuit 103, a stepping motor 105 configured to be driven to rotate by the driving pulse from the driving pulse selecting circuit 104, an analogue display unit 106 having a time-of-day hands (three types of an hour hand 107, a minute hand 108, and a second hand 109 in the example shown in FIG. 1) for being driven to rotate by the stepping motor 105 for indicating the time of day, a rotation detecting circuit 110 configured to detect the induced signal which indicates the state of rotation from the stepping motor 105 in a predetermined detection segment, and a detecting segment determining circuit 111 configured to compare the induced signal indicating that the stepping motor 105 is rotated with the time of day and a segment where the rotation detecting circuit 110 detects and determine the segment where the induced signal is detected. As described later, the detecting segment for detecting whether or not the stepping motor 105 is rotated is divided into three segments.

The rotation detecting circuit 110 has the same configuration as the rotation detecting circuit described in JP-B-61-15385, and determines the level of the induced signal generated by free vibration after having driven the stepping motor 105 to rotate, and a reference threshold voltage Vcomp is set so that determination whether rotation or no-rotation and a driving pulse change control can be performed according to the combination of the segments where the induced signals exceeding a predetermined level are detected.

The oscillating circuit 101 and the dividing circuit 102 configures a signal generating unit, and the analogue display unit 106 configures a time-of-day display unit. The rotation detecting circuit 110 constitutes a rotation detecting unit, and the control circuit 103, the driving pulse selecting circuit 104, and the detecting segment determining circuit 111 constitute a control unit.

Figure 2:
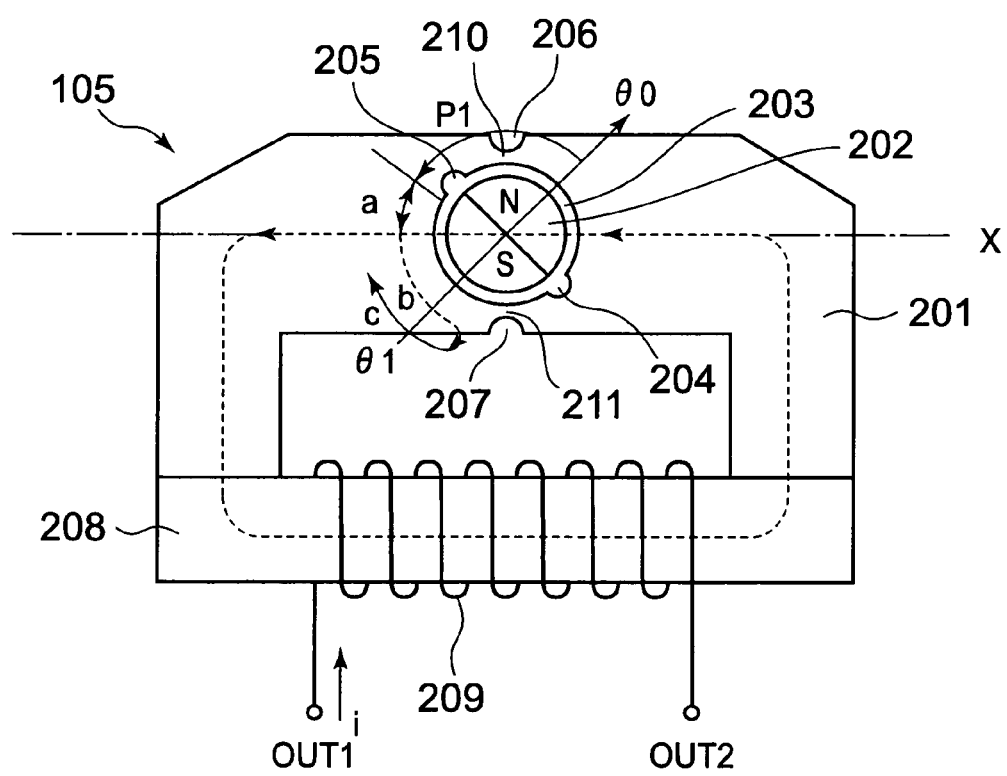
FIG. 2 is a configuration drawing of a stepping motor used in the analogue electronic timepiece according to the embodiment of the invention.

FIG. 2 is a configuration drawing of the stepping motor 105 which is used in the embodiment of the invention, and shows an example of a stepping motor for a timepiece which is generally used in the analogue electronic timepiece.

In FIG. 2, the stepping motor 105 includes a stator 201 having a rotor storage through hole 203, a rotor 202 disposed in the rotor storage through hole 203 so as to be capable of rotating therein, a magnetic core 208 joined to the stator 201, and a coil 209 wound around the magnetic core 208. When the stepping motor 105 is used in the analogue electronic timepiece, the stator 201 and the magnetic core 208 are fixed to a base panel (not shown) with screws or caulking (not shown) and are joined to each other. The coil 209 has a first terminal OUT1 and a second terminal OUT2.

The rotor 202 is magnetized in two poles (S-pole and N-pole). A plurality of (two in this embodiment) notched portions (outer notches) 206 and 207 are provided on outer end portions of the stator 201 formed of a magnetic material at positions opposing to each other with the intermediary of the rotor storage through hole 203. Provided between the respective outer notches 206 and 207 and the rotor storage through hole 203 are saturable portions 210 and 211.

The saturable portions 210 and 211 are configured not to be magnetically saturated by a magnetic flux of the rotor 202 and to be magnetically saturated when the coil 209 is excited so that a magnetic resistance is increased. The rotor storage through hole 203 is formed into a circular hole shape having a plurality of (two in this embodiment) semicircular notched portions (inner notches) 204 and 205 integrally formed at opposed portions of a through hole having a circular contour.

The notched portions 204 and 205 constitute positioning portions for positioning a stop position of the rotor 202. In a state in which the coil 209 is not excited, the rotor 202 is stably stopped at a position corresponding to the above-described positioning portions, in other words, at a position where an axis of magnetic pole of the rotor 202 extends orthogonally to a line segment connecting the notched portions 204 and 205 (a position at an angle of θ0 with respect to a direction X of the magnetic flux flowing to the stator 201) as shown in FIG. 2.

When the driving pulse selecting circuit 104 supplies a driving pulse having a rectangular waveform to between terminals OUT1 and OUT2 of the coil 209 (for example, the first terminal OUT1 side is a positive pole and the second terminal OUT2 side is a negative pole), and allows a current i to flow in the direction indicated by an arrow in FIG. 2, the magnetic flux in the direction of an arrow of a broken line is generated in the stator 201. Accordingly, the saturable portions 210 and 211 are saturated, and the magnetic resistance is increased, and then the rotor 202 rotates in a direction indicated by the arrow in FIG. 2 by 180° by a mutual operation between a magnetic pole generated in the stator 201 and the magnetic pole of the rotor 202, and stops stably at an angular position θ1.

Subsequently, when the driving pulse selecting circuit 104 supplies a driving pulse having a rectangular waveform and having an opposite polarity to terminals OUT1 and OUT2 of the coil 209 (the first terminal OUT1 side is the negative pole and the second terminal OUT2 side is the positive pole, so that the polarity is inverted from the driving described above), and allows a current to flow in an opposite direction from that indicated by the arrow in FIG. 2, the magnetic flux in the opposite direction from that indicated by the arrow of the broken line is generated in the stator 201. Accordingly, the saturable portions 210 and 211 are saturated first, and then the rotor 202 rotates in the same direction as that described above by 180° by the mutual action between the magnetic pole generated in the stator 201 and the magnetic pole of the rotor 202, and stops stably at an angular position θ0.

In this manner, by supplying the signals having different polarities (alternating signals) to the coil 209, the operation is repeatedly performed, so that the rotor 202 is rotated continuously in the direction indicated by the arrow by 180° each. In this embodiment, a plurality of main driving pulses P10 to P1m and the correction driving pulse P2 having energies different from each other are used as the driving pulses as described later.

FIG. 3 is a timing chart showing a state in which the stepping motor 105 is driven with a main driving pulse P1 and the correction driving pulse P2 in this embodiment, and shows both the magnitude of a load and the rotational position of the rotor 202.

In FIG. 3, reference numeral P1 designates also a position to which the rotor 202 is driven to rotate by the main driving pulse P1, and reference signs a to e designate the rotational positions of the rotor 202 by the free vibration after having stopped the driving of the main driving pulse P1.

When a spatial area where a main magnetic pole of the rotor 202 is positioned is divided in to a first quadrant I to a fourth quadrant IV according to the rotation about the rotor 202, a first segment T1a is a segment for determining the state of rotation of the rotor 202 in the second quadrant II, a second segment T1b and a third segment T2 are segments for determining the state of rotation of the rotor 202 in the third quadrant III in a state in which the increment of the load is smaller (small load) than the load in the normal driving (normal load).

Reference sign Vcomp is a reference threshold voltage for determining the voltage level of the induced signal generated in the stepping motor 105 and, the reference threshold voltage Vcomp is set in such a manner that when the rotor 202 performs a certain big action as in the case where the stepping motor 105 is rotated, the induced signal exceeds the reference threshold voltage Vcomp, and when the rotor 202 does not perform the certain big action as in the case of not rotating, the induced signal does not exceed the reference threshold voltage Vcomp.

A predetermined time immediately after the drive by the main driving pulse P1 is designated as the first segment T1a, a predetermined time after the first segment T1a is designated as the second segment T1b, and a predetermined time after the second segment is designated as the third segment T2. In this manner, an entire detection segment starting from a timing immediately after the drive by the main driving pulse P1 is divided into a plurality of segments (in this embodiment, three segments T1a to T2).

In this embodiment, a mask segment, which is a period in which the induced signal is not detected, is not provided.

Although detailed description will be given later, in the stepping motor control circuit according to the embodiments of the invention, in FIG. 2, the induced signal corresponding to an induced voltage generated in an area a is detected in the first segment T1a, the induced signal generated in an area c is detected in the third segment, and the induced signal generated in an area b is detected across the second segment T1b and the third segments T2 in the opposite polarity in a state of small load.

When the stepping motor 105 is rotated, an induced signal exceeding the reference threshold voltage Vcomp is generated in the third segment T2.

In the case of a rotation having large driving energy in comparison with the magnitude of the load, the induced signal exceeding the reference threshold voltage Vcomp is not generated neither in the first segment T1a nor the second segment T1b (the state of "normal load" in FIG. 3). In this case, it is determined that the driving energy is too large, the main driving pulse P1 is moved down by one rank to the main driving pulse P1 having smaller energy (pulse down).

In the case of a rotation having adequate driving energy in comparison with the magnitude of the load, the induced signal exceeding the reference threshold voltage Vcomp is generated in the first segment T1a, and is generated or is not generated in the second segment T1b depending on the case (the state of "small load" in FIG. 3). In this case, it is determined that the driving energy is adequate, and is adapted not to change the main driving pulse P1 (maintained).

In the case of a rotation having no reserved driving energy in comparison with the magnitude of the load, the induced signal exceeding the reference threshold voltage Vcomp is not generated in the first segment T1a, and is generated in the second segment T1b (the state of "large load" in FIG. 3).

In either cases described above, since the stepping motor 105 is rotated, the induced signal exceeding the reference threshold voltage Vcomp is generated in the third segment T2.

In contrast, when the stepping motor 105 is not rotated, the induced signal exceeding the reference threshold voltage Vcomp is not generated in the third segment T2, and the induced signal exceeding the reference threshold voltage Vcomp is generated or is not generated in the first segment T1a and in the second segment T1b depending on the case (the state of "no-rotation" in FIG. 3). In the case of the no-rotation, the correction driving pulse P2 is used for driving.

In other words, as shown in a determination chart in FIG. 4, when the induced signal exceeding the reference threshold voltage Vcomp is detected only in the segment T2, it is determined to be the rotation having the reserved capacity in driving energy, and the main driving pulse P1 is moved down by a rank.

When the induced signal exceeding the reference threshold voltage Vcomp is detected in all of the segments T1a to T2, or only in the segment T1a and T2 (at least the segments T1a and T2), it is determined to be the rotation without the reserved capacity to move the driving energy down by a rank, and the main driving pulse P1 is maintained in status quo without being changed.

When the induced signal exceeding the reference threshold voltage Vcomp is detected only in the segment T1b and T2, it is determined to be the rotation having the critical driving energy, so that the driving by the correction driving pulse P2 is not performed and the main driving pulse P1 is moved up by one rank.

When the induced signal exceeding the reference threshold voltage Vcomp is not detected in the segment T2, it is determined to be the no-rotation so that the stepping motor 105 is driven by the correction driving pulse P2, and then the main driving pulse P1 is moved up by one rank.

Figure 5:
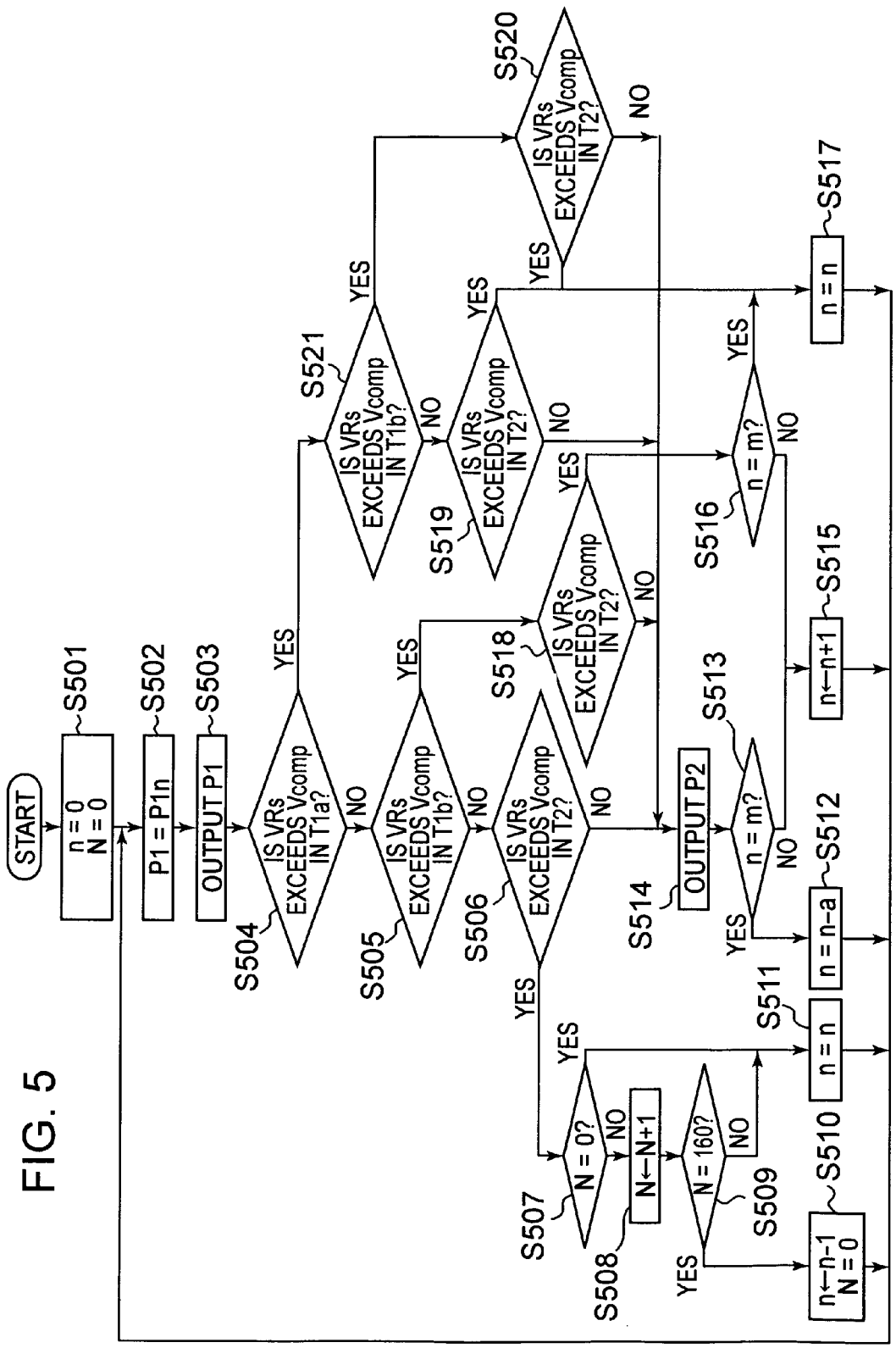
FIG. 5 is a flowchart showing the operation of the stepping motor control circuit and the analogue electronic timepiece according to the embodiment of the invention.

FIG. 5 is a flowchart showing the operation of the stepping motor control circuit and the analogue electronic timepiece according to the embodiment of the invention, and is a flowchart showing mainly the process of the control circuit 103.

Referring now to FIG. 1 to FIG. 5, an operation of the stepping motor control circuit and the analogue electronic timepiece according to the embodiment of the invention will be described in detail.

In FIG. 1, the oscillating circuit 101 generates a reference clock signal of a predetermined frequency, and the dividing circuit 102 divides the signal generated in the oscillating circuit 101 to generate a clock signal as a reference of time count and outputs the same to the control circuit 103.

The control circuit 103 counts the time signal and performs a time counting operation, and a rank n and a number of times N of a main driving pulse P1n is set to 0 (Step S501 in FIG. 5) first, and outputs the control signal so as to drive the stepping motor 105 to rotate by the main driving pulses P10 having the minimum pulse width (Steps S502 and S503).

The driving pulse selecting circuit 104 drives the stepping motor 105 to rotate by the main driving pulses P10 in response to the control signal from the control circuit 103. The stepping motor 105 is driven to rotate by the main driving pulse P10 and drives the time-of-day hands 107 to 109 to rotate. Accordingly, when the stepping motor 105 rotates normally, the current time is displayed on the display unit 106 by the time-of-day hands 107 to 109 any time.

The control circuit 103 performs a determination whether or not the rotation detecting circuit 110 detects an induced signal VRs of the stepping motor 105 exceeding the predetermined reference threshold voltage Vcomp, and a determination whether or not the detecting segment determining circuit 111 determines a detected time t of the induced signal VRs is within the segment T1a and, when it is determined that the induced signal VRs exceeding the reference threshold voltage Vcomp is not detected in the segment T1a (Step S504), whether or not the induced signal VRs exceeding the reference threshold voltage Vcomp is detected in the segment T1b is determined in the same manner (Step S505).

When it is determined that the induced signal VRs exceeding the reference threshold voltage Vcomp is not detected in the segment T1b in the process step S505, the control circuit 103 determines whether or not the induced signal VRs exceeding the reference threshold voltage Vcomp is detected in the segment T2 in the same manner (Step S506).

When it is determined that the induced signal VRs exceeding the reference threshold voltage Vcomp is not detected in the segment T2 in the process step S506, it is the state of no-rotation, and the control circuit 103 drives the stepping motor 105 by the correction driving pulse P2 (Step S514) and when the rank n of the main driving pulse P1 is not a maximum rank m, changes the main driving pulse P1 to a main driving pulse P1(n+1) by moving up by one rank, and uses the main driving pulse P1(n+1) for the next driving (Step S513 and S515).

When the rank n of the main driving pulse P1 is the maximum rank m in the process step S513, the control circuit 103 determines that the rotation cannot be achieved even when the driving is attempted by the main driving pulse P1m having the maximum energy for the next time, and hence changes the main driving pulse P1 to a main driving pulse P1(n−a) having smaller energy by the predetermined amount for power saving, and the main driving pulse P1(n−a) is used for the next driving (Step S512). At this time, the main driving pulse P1 may be changed to the main driving pulse P10 having the minimum energy for achieving a large power saving effect.

When it is determined that the induced signal VRs exceeding the reference threshold voltage Vcomp is detected in the segment T1b in the process step S505, the control circuit 103 determines whether or not the induced signal VRs exceeding the reference threshold voltage Vcomp is detected in the segment T2 is determined (Step S518).

When it is determined that the induced signal VRs exceeding the reference threshold voltage Vcomp is not detected in the segment T2 in the process step S518, the control circuit 103 causes the procedures to go to the process step S514.

When it is determined that the induced signal VRs exceeding the reference threshold voltage Vcomp is detected in the segment T2 in the process step S518, the control circuit 103 causes the procedure to go to the process step S515 when the rank n of the main driving pulse P1 is not the maximum rank m, and returns to the process step S502 without changing the main driving pulse P1 since the rank cannot be moved up when the rank n of the main driving pulse P1 is the maximum rank m (Step S516 and S517).

When it is determined that the induced signal VRs exceeding the reference threshold voltage Vcomp is detected in the segment T1a in the process step S504, the control circuit 103 determines whether or not the induced signal VRs exceeding the reference threshold voltage Vcomp is detected in the segment T1b (Step S521).

When it is determined that the induced signal VRs exceeding the reference threshold voltage Vcomp is not detected in the segment T1b in the process step S521, the control circuit 103 causes the procedure to go to the process step S514 when it is determined that the induced signal VRs exceeding the reference threshold voltage Vcomp is not detected in the segment T2, and causes the procedure to go to the process step S517 when it is determined that the induced signal VRs exceeding the reference threshold voltage Vcomp is detected in the segment T2 (Step S519).

When it is determined that the induced signal VRs exceeding the reference threshold voltage Vcomp is detected in the segment T1b in the process step S521, the control circuit 103 causes the procedure to go to the process step S517 when it is determined that the induced signal VRs exceeding the reference threshold voltage Vcomp is detected in the segment T2, and causes the procedure to go to the process step S514 when it is determined that the induced signal VRs exceeding the reference threshold voltage Vcomp is not detected in the segment T2 (Step S520).

In contrast, when it is determined that the induced signal VRs exceeding the reference threshold voltage Vcomp is detected in the segment T2 in the process step S506, the control circuit 103 uses the main driving pulse P1 for driving for the next time without changing the main driving pulse P1 since the rank cannot be moved down when the rank n of the main driving pulse P1 is a lowest rank 0 (Step S507 and S511).

In the process step S507, the control circuit 103 increments the number of times N by one when the rank n is not 0 (Step S508). When the number of times N reaches the predetermined number (160 in this embodiment), the rank n of the main driving pulse P1 is moved down by one rank to (n−1), and resets the number of times N to 0, and the procedure goes back to the process step S502 (Step S510). In other words, when the process from the process step S504 to the process step S505, and S506 to S509 are performed continuously by a predetermined number of times, the main driving pulse is moved down by one rank.

When the number of times N is not the predetermined number of times in the process step S509, the control circuit 103 causes the procedure to go to process step S511 and does not change the rank.

As described above, according to the motor control circuit in the embodiment, in a load state in which a small increment of the load is added to the normal load (small load), the first segment T1a is a segment for determining the state of rotation of the rotor 202 in the second quadrant II and the second segment T1b and the third segment T2 are segments for determining the state of rotation of the rotor 202 in the third quadrant III, and the main driving pulse P1 is changed to the main driving pulse having large energy when the induced signal VRs exceeding the reference threshold voltage Vcomp is not detected in at least one of the first segment T1a and the third segment T2, and is detected in the second segment T1b.

In this manner, by performing driving pulse control on the basis of the induced signal VRs generated in the initial rotation detection segment having a small load fluctuation immediately after the blockage of the main driving pulse P1, the stability of the driving pulse control can be realized by performing the accurate detection of rotation without being affected by the fluctuation or variations of the load of the gear train or the like, so that the occurrence of excessive pulse up control is restrained, and reduction of the current consumption is achieved.

Also, by the reduction of the variations of pulse down control, control to prevent the pulse down to the main driving pulse having a potential to cause the state of no-rotation is enabled, so that stabilization of a rotating operation is enabled and, since consideration of erroneous determination of the no-rotation in design is no longer necessary, improvement of design flexibility is advantageously achieved.

Also, in an analogue electronic timepiece having a stepping motor configured to drive a time-of-day hand to rotate, and a stepping motor control circuit configured to control the stepping motor, reduction of the current consumption is achieved by restraining the occurrence of the excessive pulse up control. Prevention of the rank down to the main driving pulse having a potential to cause the state of no-rotation is enabled, so that the accurate time counting operation is advantageously enabled.

Figure 6:
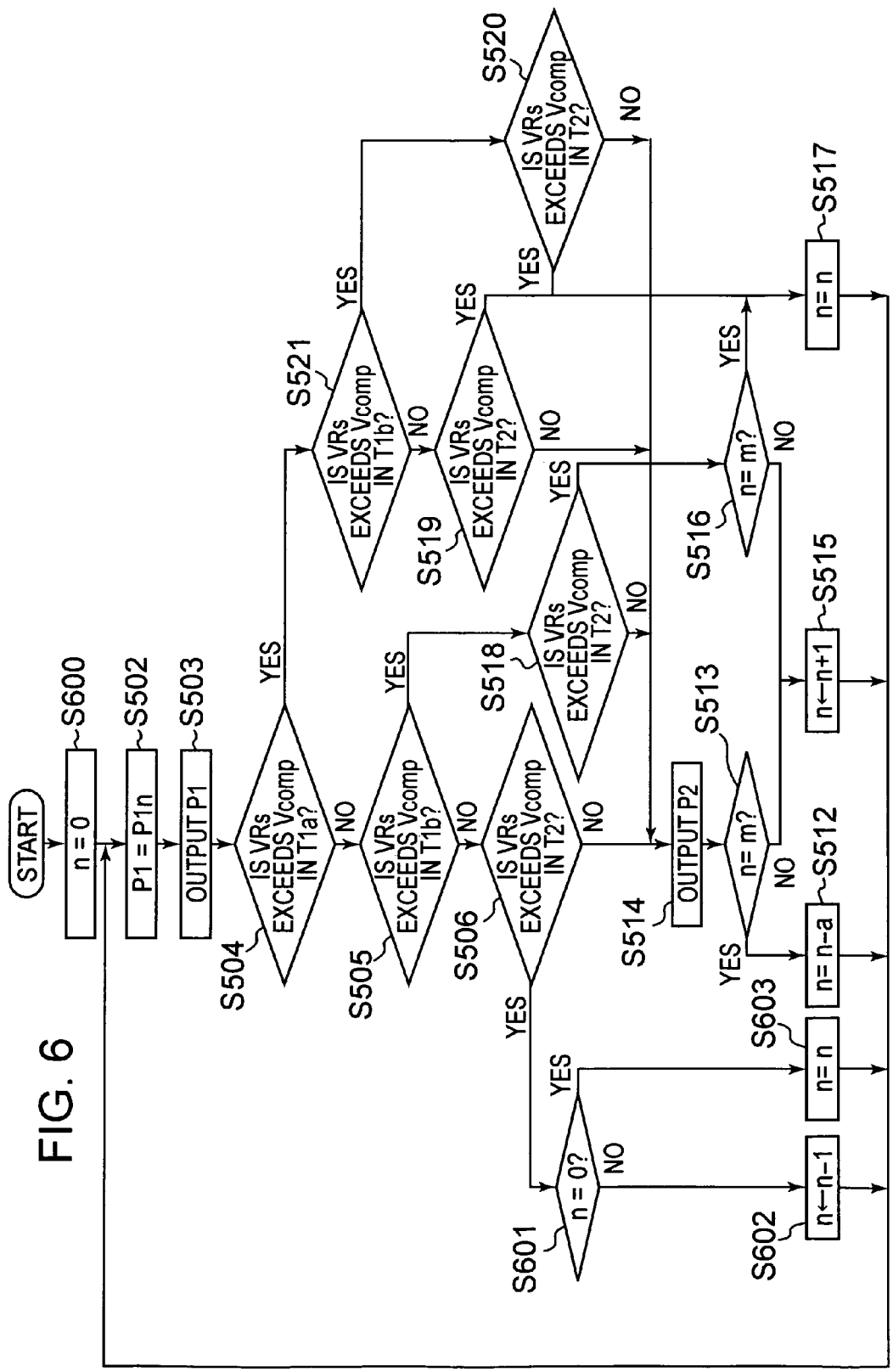
FIG. 6 is a flowchart showing the operation of the stepping motor control circuit and the analogue electronic timepiece according to another embodiment of the invention.

FIG. 6 is a flowchart showing the process in another embodiment of the invention, and the same components as FIG. 5 are designated by the same reference numerals. In the embodiment, the rank down is performed when the continuous rotation by the predetermined number of times (N times) occurs. However, in the another embodiment, the rank down by one rank is performed when the induced signal VRs exceeding the reference threshold voltage Vcomp is detected once in the segment T2 in the process step S506 and if the main driving pulse P1 at that time is not the lowest rank 0 (process step S600, S601 to S603). In the another embodiment, since it is not necessary to set the number of times N, the initial setting of the number of times is not performed in the process step S600, and only the rank n is set to the lowest rank 0 initially.

In another embodiment, the same effects as the embodiment described above are achieved. Since it is not necessary to count the number of times N, the configuration is simple in comparison with the embodiment described above.

Figure 7:
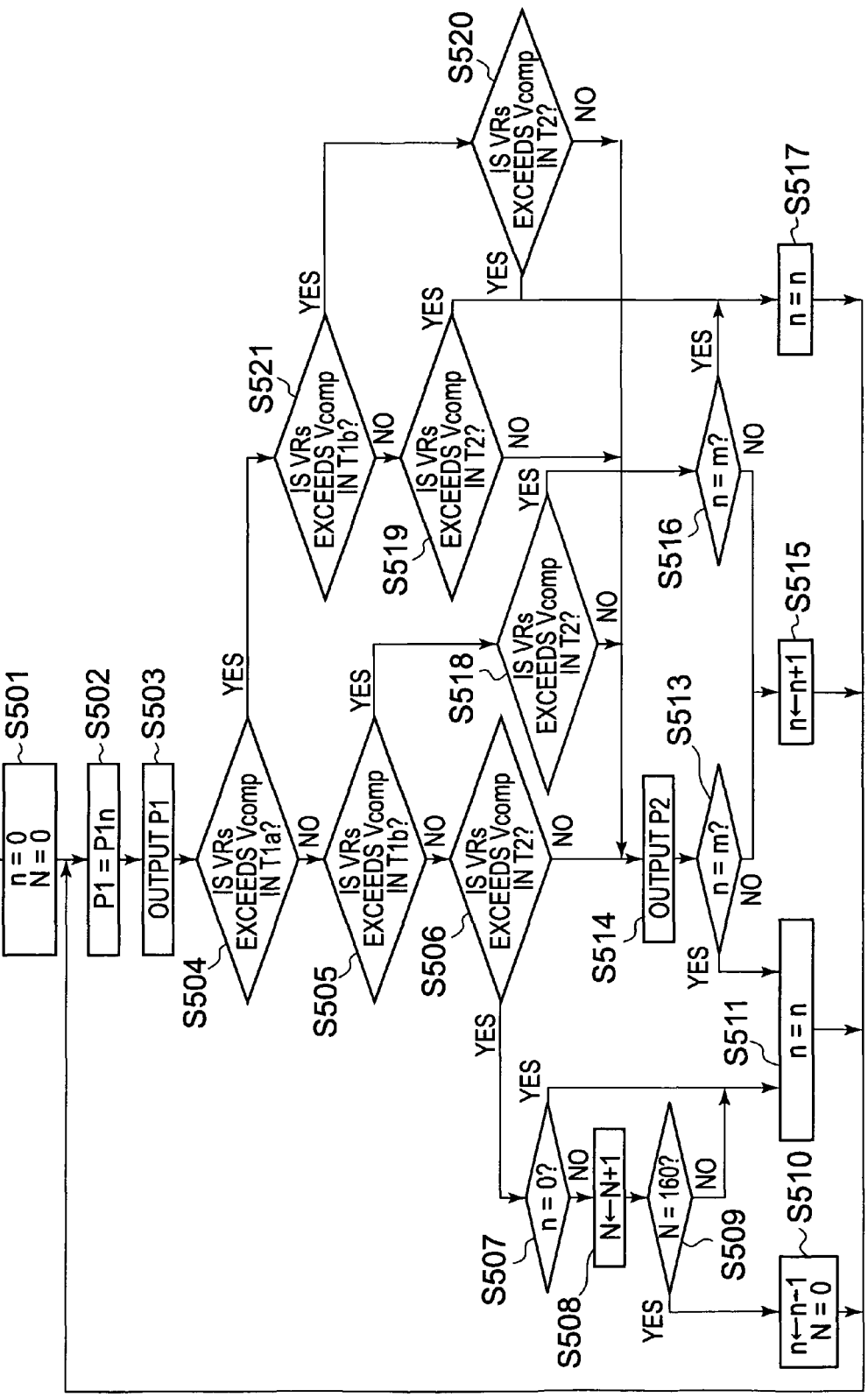
FIG. 7 is a flowchart showing the operation of the stepping motor control circuit and the analogue electronic timepiece according to still another embodiment of the invention.

FIG. 7 is a flowchart showing the process in still another embodiment of the invention, and the same components as FIG. 5 are designated by the same reference numerals. In the embodiment shown in FIG. 5, when the main driving pulse has the maximum energy, the main driving pulse is changed to the main driving pulse having smaller energy (Step S513, S512). However, in the still another embodiment, after having driven by the correction driving pulse P2, if the main driving pulse P1 driven in the process step S513 is the maximum energy, the procedure goes to the process step S511, and the main driving pulse P1 is not changed.

In this configuration, when the rotational driving is enabled again by the main driving pulse as in the case where the load of the stepping motor 105 is restored to a normal state by the driving by the correction driving pulse P2, the next rotational driving is achieved by the main driving pulse P1m having the maximum energy, so that the reliable rotational driving is achieved by the main driving pulse P1m. Therefore, when the normal state or the like is restored, a potential to be able to avoid the driving by the correction driving pulse P2 is increased, so that the energy saving is advantageously enabled.

Figure 8:
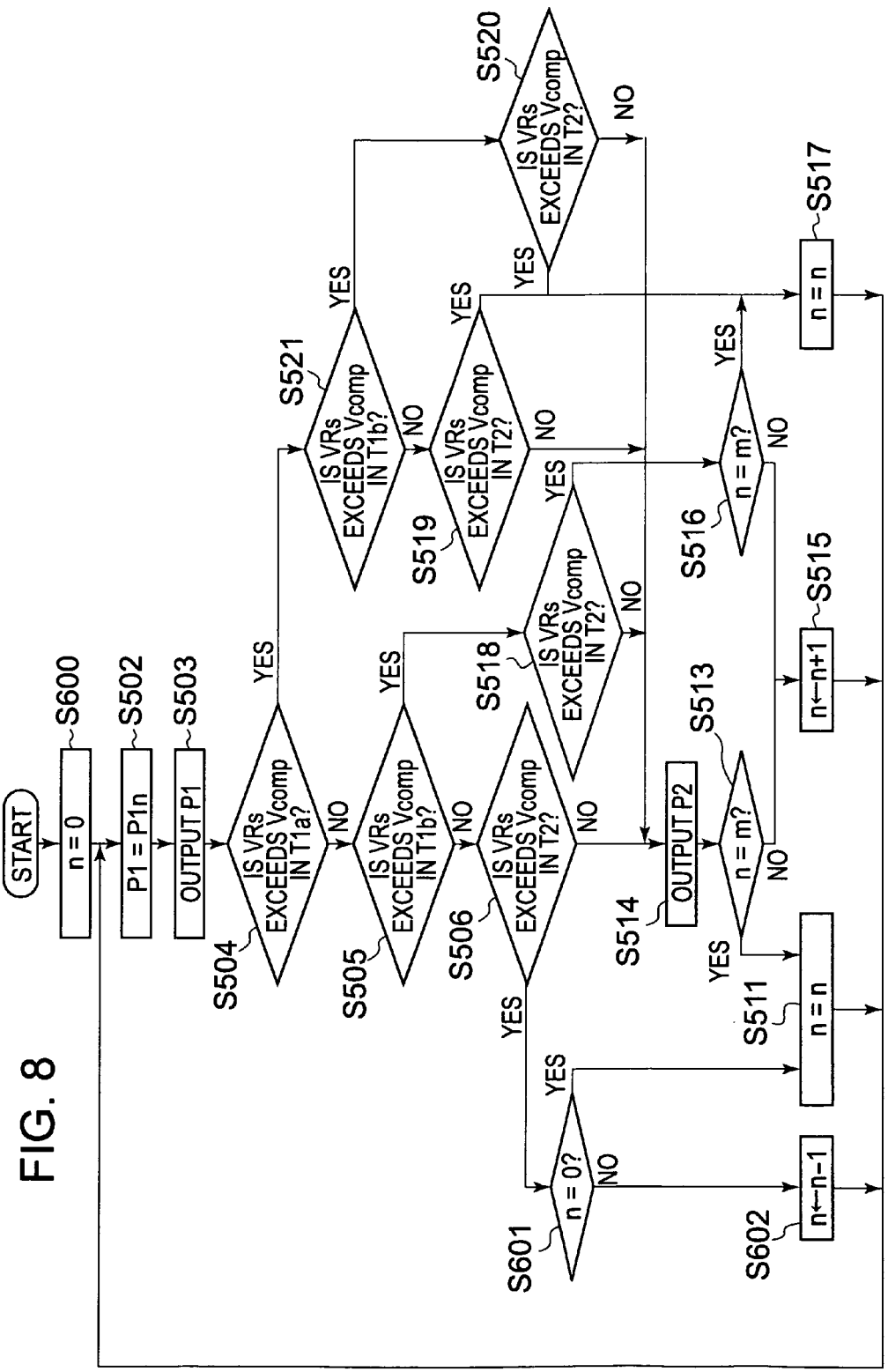
FIG. 8 is a flowchart showing the operation of the stepping motor control circuit and the analogue electronic timepiece according to further another embodiment of the invention.

FIG. 8 is a flowchart showing the process in further another embodiment of the invention, and the same components as FIG. 6 are designated by the same reference numerals. In the embodiment shown in FIG. 6, when the main driving pulse P1 has the maximum energy, the main driving pulse P1 is changed to the main driving pulse P1 having the smaller energy (Step S513, S512). However, in the further another embodiment, after having driven by the correction driving pulse P2, if the main driving pulse P1 driven in the process step S513 is the maximum energy, the procedure goes to the process step S511, and the main driving pulse P1 is not changed.

In this configuration, when the motor load is restored to the normal state by the driving by the correction driving pulse P2 in the same manner as the embodiment shown in FIG. 7, a potential to be able to avoid the driving by the correction driving pulse P2 is increased, so that the energy saving is advantageously enabled.

Figure 9:
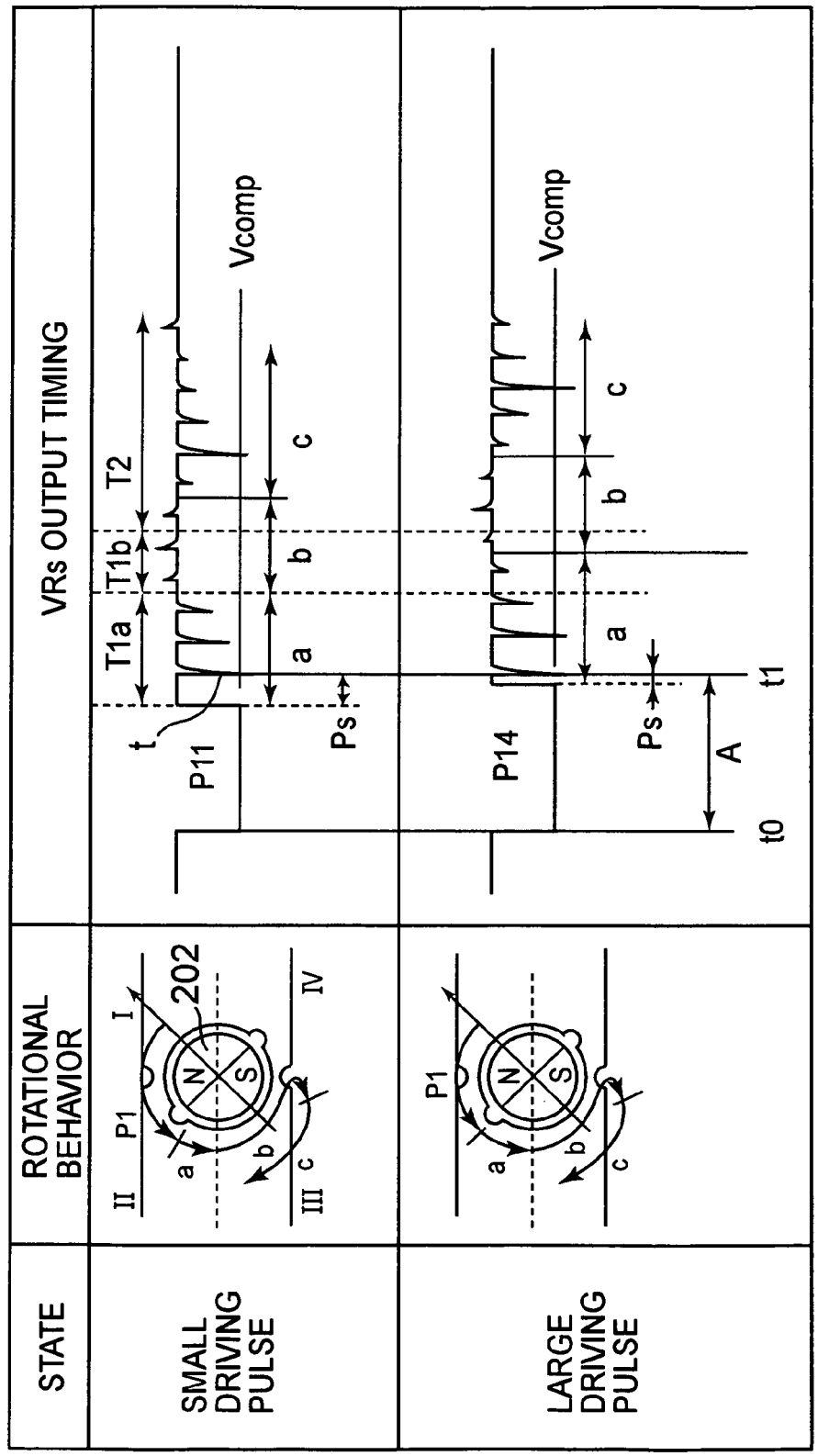
FIG. 9 is a timing chart for explaining the operation of the stepping motor control circuit and the analogue electronic timepiece according to the respective embodiments of the invention.

FIG. 9 is a timing chart common to the respective embodiments, and the same components as FIG. 3 are designated by the same reference numerals.

In FIG. 9, the control circuit 103 controls the driving pulse selecting circuit 104 so that the driving pulse selecting circuit 104 selects the main driving pulse P1 having energy suitable for driving and outputs the same, and the main driving pulse P1 is configured to be changed in energy by changing the pulse width.

From a driving starting time point t0 by the main driving pulse P1 to a rotating state detection starting time point t1 of the rotation detecting circuit 110 is set to a predetermined certain period A. Therefore, if the energy of the main driving pulse P1 is different, a period Ps from the time point when the driving by the main driving pulse P1 is ended to the rotating state detection starting time point t1 is also different. The period Ps included in the detecting segment is in a state in which the both ends of the coil 209 of the stepping motor 105 is short-circuited to damp the stepping motor 105.

At the rotation state detection starting time point t1, the rotation detecting circuit 110 detects the induced signal VRs generated in a detected resistance (not shown) in the rotation detecting circuit 110 by the known switching control, and detects the state of rotation of the stepping motor 105.

As described above, the period Ps is different depending on the rank of the main driving pulse P1, that is, the pulse width. For example, as shown in FIG. 9, when a main driving pulse P11 and a main driving pulse P14 are compared, the period Ps of the main driving pulse P11 having smaller energy (smaller pulse width) is longer than that of the main driving pulse P14 having larger energy (larger pulse width). Therefore, dumped state continues longer in the case of driving by the main driving pulse P11 than the case of driving by the main driving pulse P14.

In this manner, even when the pulse width of the main driving pulse P1 is different, the detection of the state of rotation is started at the same timing. Therefore, the damped period Ps varies, and a peak detected time point t of the induced signal VRs is varied as in the case of the above-described load fluctuations. However, according to the embodiment, an accurate detection of rotation is achieved in the manner described above. Therefore, stability of the driving pulse control is realized, occurrence of excessive pulse up control is restrained, and reduction of current consumption is achieved.

Even in a configuration in which other operations such as releasing the both end of the driving coil 209 are performed in the period Ps instead of damping the stepping motor 105, the accurate detection of the state of rotation is enabled in the same manner as described above, so that adequate driving pulse control is achieved.

Although the pulse width is changed in order to change the energy of the respective main driving pulses P1 in the embodiment described above, the energy of the main driving pulse P1 may be changed by employing a comb-shaped chopping waveform as the main driving pulse P1 and changing the number or duty of chopping. The energy can be changed also by keeping the pulse width constant and changing pulse voltage. In this manner, when changing the energy with the pulse width kept constant, the period Ps shown in FIG. 9 is kept constant, and the fluctuations do not have to be taken into consideration.

The invention is also applicable to a stepping motor for driving calendars or the like in addition to the time-of-day hands.

Also, although the electronic timepiece has been described as the example of the application of the stepping motor, it may be applicable to the various electronic instruments which use the motor.

The stepping motor control circuit according to the invention may be applicable to various electronic instruments using the stepping motor.

The electronic timepiece according to the invention is applicable to various analogue electronic clocks with a calendar function such as analogue electronic standing clocks with a calendar functions or analogue electronic timepieces with the calendar function, as well as various analogue electronic clocks.

What is claimed is:

1. A stepping motor control circuit comprising:
a rotation detecting unit configured to detect an induced signal generated by a rotation of a rotor of a stepping motor and detect the state of rotation of the stepping motor depending on whether or not the induced signal exceeds a predetermined reference threshold voltage in a predetermined detecting segment; and
a control unit configured to control the driving of the stepping motor by any one of a plurality of main driving pulses having energies different from each other or a correction driving pulse having larger energy than the respective main driving pulse according to a result of detection by the rotation detecting unit, wherein
the detection segment is divided into a first segment immediately after the drive with the main driving pulse, a second segment after the first segment, and a third segment after the second segment,
the first segment is a segment for determining the state of rotation of the rotor in a second quadrant, and the second segment and the third segment are segments for determining the state of rotation of the rotor in a third quadrant in a state in which the increment of the load is smaller than a normal load, and
the control unit changes the main driving pulse to a main driving pulse having larger energy when the rotation detecting unit does not detect the induced signal exceeding the reference threshold voltage in at least one of the first segment and the third segment, but detects in the second segment.

2. A stepping motor control circuit according to claim 1, wherein the control unit changes the main driving pulse to a main driving pulse having larger energy without driving with the correction driving pulse when the rotation detecting unit detects the induced signal exceeding the reference threshold voltage in the second segment, and if the induced signal exceeding the reference threshold voltage is detected in the third segment.

3. A stepping motor control circuit according to claim 2, wherein the control unit drives with a correction driving pulse and then changes the main driving pulse to a main driving pulse having larger energy when the rotation detecting unit does not detect the induced signal exceeding the reference threshold voltage in the third segment.

4. A stepping motor control circuit according to claim 3, wherein the control unit does not change the main driving pulse when the rotation detecting unit detects the induced signal exceeding the reference threshold voltage at least in the first segment and the third segment.

5. A stepping motor control circuit according to claim 3, wherein the control unit changes the main driving pulse to a main driving pulse having smaller energy when the rotation detecting unit detects the induced signal exceeding the reference threshold voltage once or continuously by a predetermined number of times only in the third segment.

6. A stepping motor control circuit according to claim 3, wherein the control unit drives by the correction driving pulse and then changes the main driving pulse to a main driving pulse having smaller energy by a predetermined amount when the driven main driving pulse has maximum energy.

7. A stepping motor control circuit according to claim 6, wherein the control unit drives by the correction driving pulse and then changes the main driving pulse to a main driving pulse having minimum energy.

8. A stepping motor control circuit according to claim 3, wherein the control unit drives by the correction driving pulse and then does not change the main driving pulse when the driven main driving pulse has the maximum energy.

9. A stepping motor control circuit according to claim 2, wherein the control unit does not change the main driving pulse when the rotation detecting unit detects the induced signal exceeding the reference threshold voltage at least in the first segment and the third segment.

10. A stepping motor control circuit according to claim 2, wherein the control unit changes the main driving pulse to a main driving pulse having smaller energy when the rotation detecting unit detects the induced signal exceeding the reference threshold voltage once or continuously by a predetermined number of times only in the third segment.

11. A stepping motor control circuit according to claim 1, wherein the control unit drives with a correction driving pulse and then changes the main driving pulse to a main driving pulse having larger energy when the rotation detecting unit does not detect the induced signal exceeding the reference threshold voltage in the third segment.

12. A stepping motor control circuit according to claim 11, wherein the control unit does not change the main driving pulse when the rotation detecting unit detects the induced signal exceeding the reference threshold voltage at least in the first segment and the third segment.

13. A stepping motor control circuit according to claim 11, wherein the control unit changes the main driving pulse to a main driving pulse having smaller energy when the rotation detecting unit detects the induced signal exceeding the reference threshold voltage once or continuously by a predetermined number of times only in the third segment.

14. A stepping motor control circuit according to claim 11, wherein the control unit drives by the correction driving pulse and then changes the main driving pulse to a main driving pulse having smaller energy by a predetermined amount when the driven main driving pulse has maximum energy.

15. A stepping motor control circuit according to claim 14, wherein the control unit drives by the correction driving pulse and then changes the main driving pulse to a main driving pulse having minimum energy.

16. A stepping motor control circuit according to claim 11, wherein the control unit drives by the correction driving pulse and then does not change the main driving pulse when the driven main driving pulse has the maximum energy.

17. A stepping motor control circuit according to claim 1, wherein the control unit does not change the main driving pulse when the rotation detecting unit detects the induced signal exceeding the reference threshold voltage at least in the first segment and the third segment.

18. A stepping motor control circuit according to claim 1, wherein the control unit changes the main driving pulse to a main driving pulse having smaller energy when the rotation detecting unit detects the induced signal exceeding the reference threshold voltage once or continuously by a predetermined number of times only in the third segment.

19. A stepping motor control circuit according to claim 1, wherein a period from a driving starting time point by the main driving pulse until a rotating state detection starting time point of the rotation detecting unit is set to a certain period even when the energy of the driven main driving pulse is different, and the control unit changes the energy of the main driving pulse by changing a pulse width.

20. An analogue electronic timepiece having a stepping motor configured to drive a time-of-day hand to rotate, and a stepping motor control circuit configured to control the stepping motor, wherein
the stepping motor control circuit according to claim 1 is used as the stepping motor control circuit.

* * * * *